United States Patent
Zhang et al.

(10) Patent No.: US 9,755,209 B2
(45) Date of Patent: Sep. 5, 2017

(54) METHOD FOR GROUPING LITHIUM SECONDARY BATTERY PACKS

(71) Applicant: GUANG ZHOU FULLRIVER BATTERY NEW TECHNOLOGY CO., LTD., Guangzhou (CN)

(72) Inventors: Changyong Zhang, Guangzhou (CN); Shihua Zeng, Guangzhou (CN); Dingbo Cheng, Guangzhou (CN)

(73) Assignee: Guangzhou Fullriver Battery New Tochnology Co., Ltd., Guangdong (CN)

( * ) Notice: Subject to any disclaimer, the term of this patent is extended or adjusted under 35 U.S.C. 154(b) by 965 days.

(21) Appl. No.: 14/065,083

(22) Filed: Oct. 28, 2013

(65) Prior Publication Data

US 2014/0047707 A1    Feb. 20, 2014

Related U.S. Application Data

(63) Continuation of application No. PCT/CN2012/070500, filed on Jan. 17, 2012.

(30) Foreign Application Priority Data

Apr. 29, 2011    (CN) .......................... 2011 1 0110667

(51) Int. Cl.
*H01M 10/052*    (2010.01)
*H01M 2/20*    (2006.01)
*H01M 10/058*    (2010.01)
*H01M 10/42*    (2006.01)
*H01M 10/44*    (2006.01)
*H01M 10/48*    (2006.01)

(52) U.S. Cl.
CPC ......... *H01M 2/202* (2013.01); *H01M 10/052* (2013.01); *H01M 10/058* (2013.01); *H01M 10/4207* (2013.01); *H01M 10/441* (2013.01); *H01M 10/482* (2013.01); *Y10T 29/49108* (2015.01)

(58) Field of Classification Search
CPC ............. H01M 10/4207; H01M 10/44; H01M 10/441; H01M 10/48; H01M 10/052; Y02E 60/122
See application file for complete search history.

(56) References Cited

FOREIGN PATENT DOCUMENTS

| CN | 1489237 | | 4/2004 |
|---|---|---|---|
| CN | 101764259 | * | 6/2010 |
| CN | 101924247 | * | 12/2010 |

* cited by examiner

*Primary Examiner* — Ula C Ruddock
*Assistant Examiner* — Thomas Parsons
(74) *Attorney, Agent, or Firm* — Christopher M. Scherer; DeWitt Ross & Stevens S.C.

(57) ABSTRACT

A method for grouping lithium secondary battery packs comprises the following steps: charging and discharging a battery for 1-3 cycles, recording the last discharge capacity $C_0$, setting a capacity lower limit, and determining the battery with the $C_0$ thereof not less than the capacity lower limit to be an eligible battery; discharging the battery to a discharge cut-off voltage $V_d$ so the battery is discharged to a power empty state; charging the empty battery to a capacity $C_1$; storing the battery for time $t_1$ in an environment with a temperature ranging between 20-50° C., recording the battery voltage $V_1$, storing the battery again for time $t_2$ in the environment with the temperature ranging between 20-50° C., recording the battery voltage $V_2$, calculating a voltage difference $\Delta V = V_2 - V_1$ and setting the range of $\Delta V$; and grouping eligible batteries in a previous step according to a certain capacity grouping standard.

6 Claims, 1 Drawing Sheet

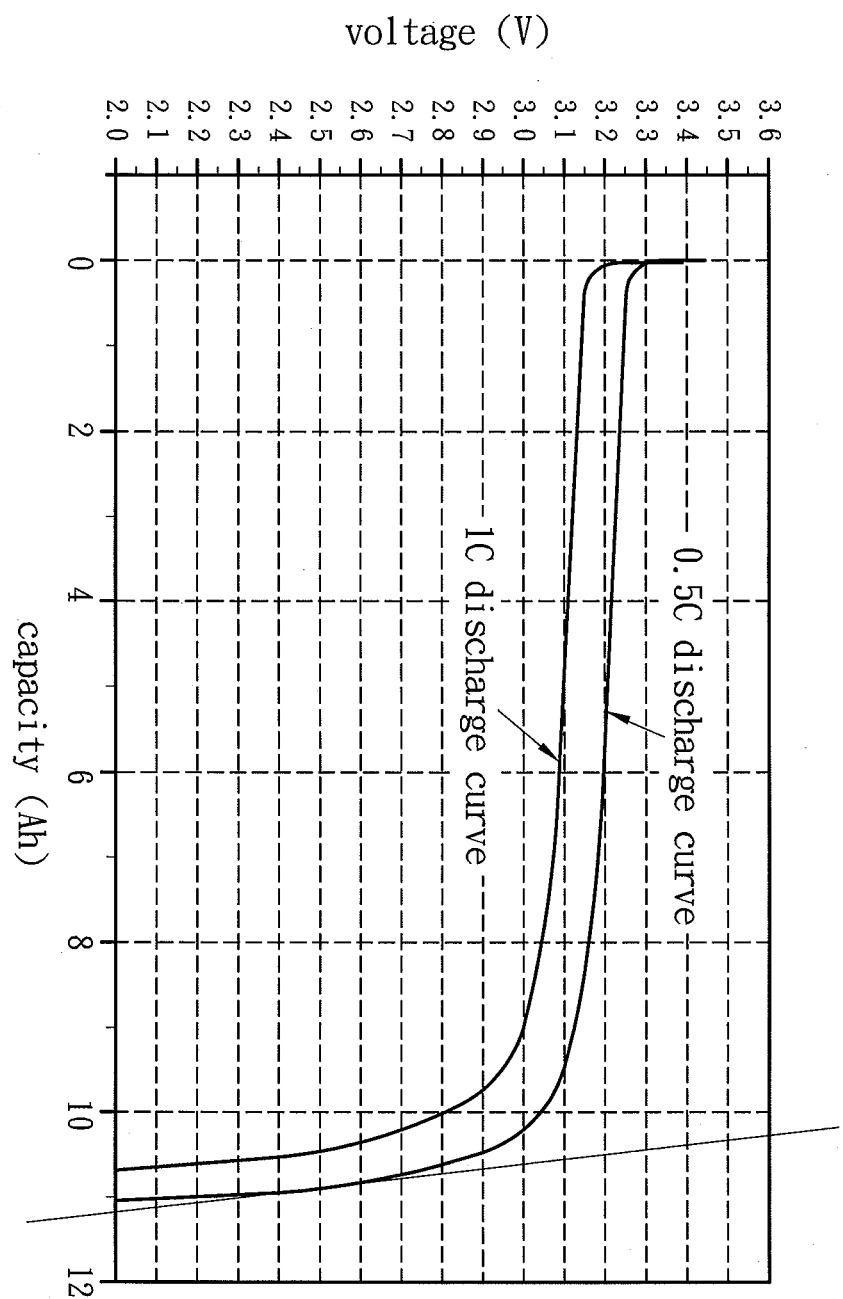

METHOD FOR GROUPING LITHIUM SECONDARY BATTERY PACKS

CROSS REFERENCE TO RELATED APPLICATIONS

This application is a Continuation of co-pending Application No. PCT/CN2012/070500 filed on Jan. 17, 2012, for which priority is claimed under 35 U.S.C. §120; and this application claims priority of Application No. 201110110667.3 filed in P.R. China on Apr. 29, 2011 under 35 U.S.C. §119, the entire contents of all of which are hereby incorporated by reference.

FIELD OF THE INVENTION

The present invention relates to a secondary battery technology, particularly to a method for grouping lithium secondary battery packs.

BACKGROUND OF THE INVENTION

The technology of lithium ion batteries is advancing fast. Meanwhile, lithium ion batteries have been widely applied in the fields of power source and power storage. Comparing with the batteries used in miniature portable electronic devices (such as mobile phones), the batteries used in the fields of power source and power storage are requested to provide features such as high output power and prolonged service life. Thus, the batteries for power source or power storage normally need to be connected in parallel or in series to form a battery pack, which is of high value and expensive. Therefore, batteries applied in fields of power source and power storage demand higher reliability and higher consistency. Since failure of any individual battery of a battery pack would induce the entire battery pack to malfunction or even cause a safety problem, the batteries to be used in battery packs should be tested and sifted to guarantee operational consistency of each battery. The factors to evaluate the consistency of batteries include capacity, voltage, discharge voltage platform, internal resistance, and self-discharge rate, wherein self-discharge rate is particularly important but hard to evaluate. In a system where batteries cannot be charged and discharged uniformly, the operational consistency of the batteries will have great changes after long time storage or long time usage because of different self-discharge rates. In an industrial standard test method for self-discharge, a fully-charged battery (SOC (State Of Charge) 100%) is left unused for 1 month, and then the charge retention rate thereof is measured. A test method for self-discharge commonly used by the manufacturers includes the following steps: charging a battery to a fully-charged state (SOC 90-100%) or a half-charged state (SOC 40-60%), storing the battery at a room temperature or a high temperature, and evaluating the self-discharge level of the battery via detecting the voltage difference between the pre-storage battery and post-storage battery. However, the conventional test methods for self-discharge have a disadvantage that a voltage-capacity relationship of the lithium ion battery is unclear. For example, there is no obvious voltage-capacity relationship in the fully-charged state and the half-charged state of a lithium iron phosphate battery. Therefore, the abovementioned methods cannot achieve the desired test effect unless the batteries are stored for a long time. Thus, the abovementioned methods are unsuitable for mass-production. Further, the higher the charged level of batteries, the greater the safety risk for storing or assembling the batteries. Furthermore, the self-discharge test of fully-charged or half-charged batteries spends a lot of time, normally 15-30 days. Thus, each cycle of batch production requires a long time, which causes high carrying costs, raises the total cost and customers are not satisfied with delivery date. If the test period is shortened, the batteries of high self-discharge are hard to be picked out. Then, the customers will complain about the unqualified products. Traditionally, the reliability of battery packs conflicts with carrying cost and fast delivery. A China Patent No. CN101764259A disclosed a self-discharge test method using a condition of SOC 50-90% and storage for 7-14 days, which uses higher SOC batteries and longer storage time. While picking those batteries out, there are both qualified batteries and unqualified batteries for self-discharge. With high SOC, a high self-discharge battery is easily to heat up and has risks of burning spontaneously, which may generate a temperature of over 130° C. High temperature may melt the internal separation membranes of neighboring batteries, which may further cause a chain reaction of internal short circuit of the batteries. Many fires occurred in battery manufacturers are attributed to spontaneous heating and burning of batteries. On the other hand, while the batteries are stored with SOC 50-90%, the voltage thereof is within the discharge platform section and relatively stable. In such a case, the voltage of the battery is hard to reveal the self-discharge level of the battery, and the batteries with high self-discharge cannot be all identified even though longer test time is used. Thus, there are always some unqualified batteries escaping from testing and mixed in battery packs. Dangers of malfunction, fire and explosion are hidden in the abovementioned unqualified batteries.

SUMMARY OF THE INVENTION

The objective of the present invention is to avoid the deficiency in the existing technology and provide a method for grouping lithium secondary packs, which spends less time in testing self-discharge (SD) of batteries and favors mass-production of battery packs, whereby batteries can be safely and efficiently assembled into highly-reliable battery packs.

Via studying the discharge curves of lithium cobalt oxide batteries, lithium manganese oxide batteries, lithium nickel manganese cobalt oxide batteries, lithium iron phosphate batteries and other lithium ion batteries, we found in the initial stage of discharge polarization makes the voltage drop quickly, then in the middle stage the voltage is relatively stable, and at last the voltage descends steeply and linearly in the final stage, where 0-10% capacity of a lithium ion battery is discharged. Via the characteristic of the horizontal discharge platform section and the linearly-descending final stage of the discharge curve, we can obtain the relationship of the ratio of the voltage to the residual capacity in the descending section of the discharge curve. Then, the SD rate can be worked out according to the variation of the storage voltage. In a power empty state or a low-charged state (SOC 0-10%), the voltage of a battery discharged spontaneously is very easy to change within 1-10 days of storage, and the SD rate within 1-10 days can be calculated from the voltage variation. On the other hand, in a power empty state or a low-charged state (SOC 0-10%), the energy released by the internal short circuit of a battery is neither sufficient to raise the temperature of the battery over the burning point nor able to melt the internal separation membranes of neighboring batteries. Therefore, a battery in a power empty state or a low-charged state would not cause a chain reaction of fires or explosions.

In summary, the present invention achieves the objective of safely and efficiently assembling batteries into highly-reliable battery packs via the following steps: using a small current to discharge the batteries to a power empty state or a low-charged state (SOC 0-10%) or charge batteries to a low-charged state (SOC 0-10%) with a small amount of electricity; testing the batteries after a short time storage to pick out the low-voltage batteries with high SD; and assembling the batteries in a power empty state or a low-charged state.

In a first embodiment, the method of the present invention comprises the following steps:

Step (1): charging and discharging batteries for 1-3 cycles, recording a last discharge capacity $C_0$ of the batteries, setting a capacity lower limit, and determining the batteries with the $C_0$ thereof not less than the capacity lower limit to be eligible batteries.

The capacity lower limit is a minimum eligible capacity defined by industry technology and normally equal to or slightly higher than a rated capacity $C_5$ to guarantee that a capacity of each of the batteries delivered to the customers can reach the rated capacity $C_5$, which is within the range of 5-500 Ah. In the abovementioned process, the batteries are charged with a constant current of 0.1-5 $C_5$ to a charge cut-off voltage $V_c$ of 3.6-4.2V, and the batteries are changed to be charged with a constant voltage to the charge cut-off current of 0.01-0.5 $C_5$, and then the batteries are discharged with a constant current of 0.2-10 $C_5$ to a discharge cut-off voltage $V_d$ of 2-3V.

The charge cut-off voltage $V_c$ of the battery is determined by a system of the battery. For example, the lithium cobalt oxide-graphite system has a charge cut-off voltage $V_c$ of 4.2V, and the lithium iron phosphate-graphite system has a charge cut-off voltage $V_c$ of 3.6V. The discharge cut-off voltage $V_d$ of the battery is also determined by the system of the battery. For example, the lithium cobalt oxide-graphite system has a discharge cut-off voltage $V_d$ of 3V, and the lithium iron phosphate-graphite system has a discharge cut-off voltage $V_d$ of 2V. The rated capacity is a capacity labeled by the manufacturer for a battery or a battery pack and means the electricity discharged by a battery at an ambient temperature of 23±2° C. with a discharge rate of 5 h to the discharge cut-off voltage $V_d$. The rated capacity is denoted by $C_5$, and a unit thereof is Ah or mAh.

Step (2): succeeding to the last discharge of Step (1), discharging continuously the batteries with 0.01-0.5 $C_5$ to the discharge cut-off voltage $V_d$ of 2.0-3.0V so as to discharge the batteries to a power empty state. Discharging at a low discharge rate is to reduce an influence of polarization, whereby the batteries can be discharged to a power empty state more uniformly, and whereby the discharged batteries have higher consistency in voltages after discharging.

Step (3): charging the batteries in the power empty state that were discharged in Step (2) with 0.01-0.5 $C_5$ to a capacity $C_1$, which is 0.1-10% of the rated capacity $C_5$, preferably 2-5% of the rated capacity $C_5$.

Step (4): storing the batteries processed in Step (3) for time $t_1$ in an environment with a temperature ranging between 20-50° C., and measuring and recording a battery voltage $V_1$ of each battery after being stored. Then storing continuously the batteries for time $t_2$ in the environment with the temperature ranging between 20-50° C., and measuring a battery voltage $V_2$ of each battery after being stored, calculating a voltage difference $\Delta V=V_2-V_1$ and setting the range of $\Delta V$ to be from −20 mV to 10 mV, preferably from −10 mV to 5 mV. The time $t_1$ ranges from 1 to 48 hours, and the time $t_2$ ranges from 24-240 hours.

Step (5): grouping the eligible batteries in Step (4) into a plurality of battery packs each including specified number of series batteries according to a certain capacity grouping standard, and welding each of the battery packs to form a battery assembly. The capacity difference of the batteries in one of the battery packs is not greater than 5% of the rated capacity $C_5$, preferably not greater than 2% of the rated capacity $C_5$.

In a second embodiment, the method of the present invention comprises the following steps:

Step (1): charging and discharging the batteries for 1-3 cycles, recording the last discharge capacity $C_0$ of each battery, setting a capacity lower limit, and determining the batteries with the $C_0$ thereof not less than the capacity lower limit to be eligible batteries.

The capacity lower limit is the minimum eligible capacity defined by the industry technology and normally equal to or slightly higher than the rated capacity $C_5$ to guarantee that the capacity of each of the batteries delivered to the customers can reach the rated capacity $C_5$, which is within the range of 5-500 Ah. In the abovementioned process, the batteries are charged with a constant current of 0.1-5 $C_5$ to the charge cut-off voltage $V_c$ of 3.6-4.2V, and the batteries are changed to be charged with a constant voltage to the charge cut-off current of 0.01-0.5 $C_5$, and then the batteries are discharged with a constant current of 0.2-10 $C_5$ to the discharge cut-off voltage $V_d$ of 2-3V.

The charge cut-off voltage $V_c$ of the battery is determined by the system of the battery. For example, the lithium cobalt oxide-graphite system has a charge cut-off voltage $V_c$ of 4.2V, and the lithium iron phosphate-graphite system has a charge cut-off voltage $V_c$ of 3.6V. The discharge cut-off voltage $V_d$ of the battery is also determined by the system of the battery. For example, the lithium cobalt oxide-graphite system has a discharge cut-off voltage $V_d$ of 3V, and the lithium iron phosphate-graphite system has a discharge cut-off voltage $V_d$ of 2V. The rated capacity is the capacity labeled by the manufacturer for a battery or a battery pack and means the electricity discharged by a battery at an ambient temperature of 23±2° C. with a discharge rate of 5 h to the discharge cut-off voltage $V_d$. The rated capacity is denoted by $C_5$, and a unit thereof is Ah or mAh.

Step (2): succeeding to the last discharge of Step (1), discharging continuously the batteries with 0.01-0.5 $C_5$ to the discharge cut-off voltage $V_d$ of 2.0-3.0V so as to discharge the batteries to a power empty state. Discharging at a low discharge rate is to reduce the influence of polarization, whereby the batteries can be discharged to a power empty state more uniformly, and whereby the discharged batteries have higher consistency in voltages after discharging.

Step (3): storing the batteries processed in Step (2) for time $t_1$ in the environment with the temperature ranging between 20-50° C., and measuring and recording the battery voltage $V_1$ of each battery after being stored. Then storing continuously the batteries for time $t_2$ in the environment with the temperature ranging between 20-50° C., and measuring the battery voltage $V_2$ of each battery after being stored, calculating the voltage difference $\Delta V=V_2-V_1$ and setting the range of $\Delta V$ to be from −20 mV to 10 mV, preferably from −10 mV to 5 mV. The time $t_1$ ranges from 1 to 48 hours, and the time $t_2$ ranges from 24-240 hours.

Step (4): grouping the eligible batteries in Step (3) into a plurality of battery packs each including a specified number of series batteries according to a capacity grouping standard, and welding each of the battery packs to form a battery assembly. The capacity difference of the batteries in one of the battery packs is not greater than 5% of the rated capacity $C_5$, preferably not greater than 2% of the rated capacity $C_5$.

In a third embodiment, the method of the present invention comprises the following steps:

Step (1): charging and discharging a battery for 2-3 cycles, recording a second last discharge capacity $C_0$ of each of the batteries, setting a capacity lower limit, and determining the batteries with the $C_0$ thereof not less than the capacity lower limit to be eligible batteries, wherein a last discharge capacity is controlled to be 90-99.9% of the rated capacity $C_5$ so that a remaining capacity of the batteries is 0.1-10% of the rated capacity $C_5$ to make the batteries in a low-charged state.

The capacity lower limit is the minimum eligible capacity defined by the industry technology and normally equal to or slightly higher than the rated capacity $C_5$ to guarantee that the capacity of each of the batteries delivered to the customers can reach the rated capacity $C_5$, which is within the range of 5-500 Ah. In the abovementioned process, the batteries are charged with a constant current of 0.1-5 $C_5$ to a charge cut-off voltage $V_c$ of 3.6-4.2V, and the batteries are changed to be charged with a constant voltage to the charge cut-off current of 0.01-0.5 $C_5$, and then the batteries are discharged with a constant current of 0.2-10$C_5$ to the discharge cut-off voltage $V_d$ of 2-3V.

The charge cut-off voltage $V_c$ of the battery is determined by the system of the battery. For example, the lithium cobalt oxide-graphite system has a charge cut-off voltage $V_c$ of 4.2V, and the lithium iron phosphate-graphite system has a charge cut-off voltage $V_c$ of 3.6V. The discharge cut-off voltage $V_d$ of the battery is also determined by the system of the battery. For example, the lithium cobalt oxide-graphite system has a discharge cut-off voltage $V_d$ of 3V, and the lithium iron phosphate-graphite system has a discharge cut-off voltage $V_d$ of 2V. The rated capacity is the capacity labeled by the manufacturer for a battery or a battery pack and means the electricity discharged by a battery at an ambient temperature of 23±2° C. with a discharge rate of 5 h to the discharge cut-off voltage $V_d$. The rated capacity is denoted by $C_5$, and a unit thereof is Ah or mAh.

Step (2): Storing the battery processed in Step (1) for time $t_1$ in the environment with the temperature ranging between 20-50° C., and measuring and recording the battery voltage $V_1$ of each battery after being stored. Then storing continuously the batteries for time $t_2$ in the environment with the temperature ranging between 20-50° C., and measuring the battery voltage $V_2$ of each battery after being stored, calculating the voltage difference $\Delta V = V_2 - V_1$ and setting the range of $\Delta V$ to be from −20 mV to 10 mV, preferably from −10 mV to 5 mV. The time $t_1$ ranges from 1 to 48 hours, and the time $t_2$ ranges from 24-240 hours.

Step (3): grouping the eligible batteries in Step (2) into a plurality of battery packs each including a specified number of series batteries according to a capacity grouping standard, and welding each battery pack to form a battery assembly. The capacity difference of the batteries in one of the battery packs is not greater than 5% of the rated capacity $C_5$, preferably not greater than 2% of the rated capacity $C_5$.

In the present invention, the discharge cut-off voltage $V_d$ of the battery is determined by the battery system and ranges from 2.0-3.0V. For example, the lithium iron phosphate-graphite system has a discharge cut-off voltage $V_d$ of 2V, and the lithium cobalt oxide-graphite system has a discharge cut-off voltage $V_d$ of 3V.

Among factors influencing the reliability of the battery packs, the SD level of the batteries in one battery pack is a particularly important one. Therefore, picking out high-SD batteries is a critical factor to affect the reliability of the battery packs.

The capacity of the battery is proportional to the stable open-circuit voltage. Theoretically, the capacity of the battery can be obtained as long as the voltage thereof can be precisely measured. The relationship between the capacity and the stable open-circuit voltage of the battery is particularly obvious in a power empty state or a low-charged state (SOC 0-10%). A fully-charged battery is at a high risk of danger for storage, and is easily to form a short circuit when in operation. For the lithium iron phosphate battery, the relationship between the capacity and the stable open-circuit voltage is unobvious and likely to be interpreted incorrectly in the fully-charged state. For various types of lithium ion batteries, the relationship between the capacity and the stable open-circuit voltage is so clear in the power empty state or the low-charged state (SOC 0-10%) that even a slight SD can also be reflected by a drop of the stable open-circuit voltage. The lower the capacity of the battery, the more obvious the abovementioned phenomenon. Therefore, the present invention stores the batteries in the power empty state or the low-charged state (SOC 0-10%) and detects the variations of the open-circuit voltage of the batteries to effectively pick out high-SD batteries to guarantee the reliability of the battery packs.

A series of batteries features that an identical current flows through each of the series of batteries. In other words, the capacities of charge or discharge are identical for all batteries of the series Therefore, if the initial practical capacities (not the relative capacity (%)) of the batteries of the series are consistent, the discharge consistency of the battery pack can be ensured. The method of the present invention tests the batteries in the power empty state or the low-charged state to pick out high SD batteries, and then charges the batteries to 0-10% of the rated capacity $C_5$ to guarantee the qualified batteries to discharge consistently. Besides, the batteries in the power empty state or the low-charged state have a low risk of safety problems caused by short circuit, drop or being pierced in the fabrication process. According to the standard battery-discharge regulation, the battery discharged with 0.2 $C_5$ to the standard discharge cut-off voltage $V_d$ is regarded as in SOC 0%. In present invention, the battery that is discharged with 0.01-0.5 $C_5$ to a discharge cut-off voltage $V_d$ of 2.0-3.0V is defined to be in a power empty state. If a piercing test is performed on the battery, which is in a power empty state defined by the present invention, to cause an internal short circuit in the battery, the released residual capacity thereof is only a very small amount of electricity that will not result in obvious heating-up, firing or explosion. As long as there is current leakage occurring in the battery having a very small residual capacity, the variation of voltage can obviously reflect the current leakage. If the piercing test is performed on the battery, which is discharged to the standard discharge cut-off voltage $V_d$ according to the standard battery-discharge regulation and then charged to 0-10% of the rated capacity $C_5$ (SOC 0-10%), to cause an internal short circuit in the battery, the released heat neither melts the separation membrane of the battery nor causes fire or explosion of the battery, not to mention to cause the chain reaction of the neighboring batteries. Therefore, the battery in the power empty state or the low-charged state is very safe for fabrication. Further, while the electricity of the battery decreases in the power empty state or the low-charged state, the voltage thereof drops linearly and steeply. Thus, the voltage variation can reflect the SD level of the battery obviously and can be used to effectively pick out batteries with high-SD level. Thereby is promoted the reliability of the battery packs.

The method for grouping lithium secondary battery packs of the present invention has the following advantages: each batteries in one battery pack is less likely to be affected or endangered by self-discharge; the batteries have good consistency in discharge; the battery packs are assembled safely; the performance of battery packs has high reliability; the method is easy to operate and able to accelerate the fabrication process; the method has high potential in the market.

BRIEF DESCRIPTION OF THE DRAWINGS

The solo FIGURE shows a discharge curve of a lithium iron phosphate battery.

DETAILED DESCRIPTION OF THE PREFERRED EMBODIMENTS

The present invention will be further demonstrated with embodiments below.

Please refer to the sole FIGURE showing a discharge curve of a Type 11585135Fe lithium iron phosphate battery.

Embodiment I

The Type 11585135Fe lithium iron phosphate battery is a product of our company and has a nominal voltage of 3.2V and a rated capacity of 10 Ah. The Type 11585135Fe lithium iron phosphate batteries are to be assembled into a plurality of 1P-12S battery packs. According to the method of the present invention, the batteries are processed with the following steps:

Step (1): charging and discharging the batteries for two cycles with a charge/discharge current of 0.5 $C_5$, recording the last discharge capacity $C_0$, and determining the batteries with $C_0 \geq 10$ Ah to be eligible batteries;

Step (2): discharging continuously the eligible batteries of Step (1) with a small discharge current of 0.2 $C_5$ to a discharge cut-off voltage of 2.0V to make the batteries in a power empty state;

Step (3): storing the batteries processed in Step (2) at a room temperature for 24 hours, recording the battery voltage $V_1$ of each of the batteries after being stored, then storing the batteries at a room temperature for 120 hours, recording the battery voltage $V_2$ of each of the batteries after being stored, calculating a voltage difference $\Delta V = V_2 - V_1$, and determining the batteries with the voltage difference $\Delta V$ of $-5$ mV~5 mV to be eligible batteries; (Table.1 lists the data obtained from batteries processed the preceding steps.)

TABLE 1

| Battery No. | $C_0$ (mAh) | $C_0$ Evaluation | $V_1$ (V) | $V_2$ (V) | $\Delta V$ (mV) | $\Delta V$ Evaluation |
|---|---|---|---|---|---|---|
| F1 | 10850 | Eligible | 2.831 | 2.829 | -2 | Eligible |
| F2 | 10910 | Eligible | 2.841 | 2.840 | -1 | Eligible |
| F3 | 11020 | Eligible | 2.797 | 2.799 | 2 | Eligible |
| F4 | 10870 | Eligible | 2.819 | 2.821 | 2 | Eligible |
| F5 | 10730 | Eligible | 2.815 | 2.816 | 1 | Eligible |
| F6 | 11030 | Eligible | 2.823 | 2.822 | -1 | Eligible |
| F7 | 10660 | Eligible | 2.816 | 2.814 | -2 | Eligible |
| F8 | 11030 | Eligible | 2.836 | 2.830 | -6 | Ineligible |
| F9 | 10970 | Eligible | 2.836 | 2.836 | 0 | Eligible |
| F10 | 10920 | Eligible | 28.16 | 2.843 | 27 | Ineligible |
| F11 | 11080 | Eligible | 2.815 | 2.816 | 1 | Eligible |

TABLE 1-continued

| Battery No. | $C_0$ (mAh) | $C_0$ Evaluation | $V_1$ (V) | $V_2$ (V) | $\Delta V$ (mV) | $\Delta V$ Evaluation |
|---|---|---|---|---|---|---|
| F12 | 10990 | Eligible | 2.822 | 2.820 | -2 | Eligible |
| F13 | 10850 | Eligible | 2.812 | 2.810 | -2 | Eligible |
| F14 | 11060 | Eligible | 2.797 | 2.799 | 2 | Eligible |
| F15 | 10850 | Eligible | 2.815 | 2.817 | 2 | Eligible |
| F16 | 11100 | Eligible | 2.800 | 2.802 | 2 | Eligible |
| F17 | 10850 | Eligible | 2.823 | 2.825 | 2 | Eligible |
| F18 | 10980 | Eligible | 2.793 | 2.793 | 0 | Eligible |
| F19 | 10930 | Eligible | 2.818 | 2.820 | 2 | Eligible |
| F20 | 10940 | Eligible | 2.811 | 2.801 | -10 | Ineligible |
| F21 | 10980 | Eligible | 2.811 | 2.813 | 2 | Eligible |
| F22 | 11040 | Eligible | 2.807 | 2.810 | 3 | Eligible |
| F23 | 11010 | Eligible | 2.807 | 2.808 | 1 | Eligible |
| F24 | 10950 | Eligible | 2.802 | 2.804 | 2 | Eligible |
| F25 | 10990 | Eligible | 2.797 | 2.799 | 2 | Eligible |
| F26 | 10720 | Eligible | 2.812 | 2.809 | -3 | Eligible |
| F27 | 10680 | Eligible | 2.816 | 2.814 | -2 | Eligible |
| F28 | 10580 | Eligible | 2.818 | 2.816 | -2 | Eligible |

Step (4): grouping the batteries whose capacity difference are within 3% to assemble into the battery packs. Table.1 shows there are two groups of batteries allowed to be assembled into the 1P-12S battery packs, including a group containing F1, F2, F4, F5, F7, F13, F15, F17, F19, F24, F26 and F27, and another group containing F3, F6, F9, F11, F12, F14, F16, F18, F21, F22, F23 and F25;

Step (5): welding and assembling each of the battery packs after the eligible batteries have been grouped in Step (4), adding 12S protection boards to each of the battery packs to form a battery assembly. The 12S protection board has no balancing function, wherein the over-charge protection voltage thereof is 3.9V/section and the over-discharge protection voltage thereof is 2V/section.

Verification

A first battery pack assembled according to the abovementioned steps is charged with a constant current of 5 A to a charge cut-off voltage of 43.8V, and is changed to be charged with a constant voltage of 43.8V to a charge cut-off current of 500 mA. Then, the first battery pack is discharged with a constant current of 5 A to a discharge cut-off voltage of 24V, totally releasing a capacity of 10672 mAh. The instantaneous discharge cut-off voltages of the batteries in the first battery pack have high consistency, as shown in Table.2.

TABLE 2

| Battery No. | Discharge Cut-Off Component Voltage (V) |
|---|---|
| F1 | 2.092 |
| F2 | 2.098 |
| F4 | 2.056 |
| F5 | 2.085 |
| F7 | 2.074 |
| F13 | 2.065 |
| F15 | 2.058 |
| F17 | 2.036 |
| F19 | 2.038 |
| F24 | 2.072 |
| F26 | 2.009 |
| F27 | 2.039 |

Then, the first battery pack is charged and discharged with a current of 0.5 $C_5$ for at least one cycle. The discharged capacities and the total discharge cut-off voltages are recorded, and the total discharge cut-off voltages are used to calculate the average discharge cut-off component voltages, as shown in Table.3.

TABLE 3

| Number of Cycles | Discharge Capacity (mAh) | Total discharge cut-off voltage (V) | Average Discharge Cut-Off Component Voltage (V) |
|---|---|---|---|
| 1 | 10672 | 24.72 | 2.060 |
| 2 | 10682 | 24.73 | 2.061 |
| 3 | 10676 | 24.73 | 2.061 |
| 4 | 10675 | 24.74 | 2.062 |
| 5 | 10685 | 24.76 | 2.063 |
| 6 | 10682 | 24.73 | 2.061 |
| 7 | 10670 | 24.75 | 2.063 |
| 8 | 10668 | 24.74 | 2.062 |
| 9 | 10676 | 24.73 | 2.061 |
| 10 | 10685 | 24.75 | 2.063 |
| 11 | 10668 | 24.77 | 2.064 |
| 12 | 10665 | 24.73 | 2.061 |
| 13 | 10662 | 24.75 | 2.063 |
| 14 | 10665 | 24.74 | 2.062 |
| 15 | 10668 | 24.73 | 2.061 |
| 16 | 10660 | 24.72 | 2.060 |
| 17 | 10658 | 24.76 | 2.063 |
| 18 | 10655 | 24.75 | 2.063 |
| 19 | 10658 | 24.74 | 2.062 |
| 20 | 10662 | 24.73 | 2.061 |

With the number of cycles increasing, the released capacities of the first battery pack remain stable, and the total discharge cut-off voltages as well as the average discharge cut-off component voltages have a good consistency.

Safety Test

A nail is used to pierce the battery F28, which is not used to assemble the battery packs, to cause the internal short circuit of the battery at a room temperature of 28° C. The short-circuit point is detected to have a maximum temperature of 33° C.-5° C. higher than the room temperature, and the battery neither burns nor explodes.

Embodiment II

The Type 130125155Fe lithium iron phosphate battery is a product of our company and has a nominal voltage of 3.2V and a rated capacity of 20 Ah. The Type 130125155Fe lithium iron phosphate batteries are to be assembled into a plurality of 1P-8S battery packs. According to the method of the present invention, the batteries are processed with the following steps:

Step (1): charging and discharging the batteries for one cycle with a charge/discharge current of 0.5 $C_5$, recording the last discharge capacity $C_0$, and determining the batteries with $C_0 \geq 20$ Ah to be eligible batteries;

Step (2): discharging continuously the eligible batteries of Step (1) with a small discharge current of 0.2 $C_5$ to a discharge cut-off voltage of 2.0V;

Step (3): charging the batteries with a charge current of 0.2 $C_5$ for 12 minutes to a low-charged state (SOC 4%);

Step (4): storing the batteries processed in Step (3) at a room temperature for 12 hours, recording the battery voltage $V_1$ of each of the batteries after being stored, then storing the batteries at a room temperature for 144 hours, recording the battery voltage $V_2$ of each of the batteries after being stored, calculating a voltage difference $\Delta V = V_2 - V_1$, and determining the batteries with the voltage difference $\Delta V$ of −10 mV~0 mV to be eligible batteries; (Table.4 lists the data obtained from batteries processed the preceding steps.)

TABLE 4

| Battery No. | $C_0$ (mAh) | $C_0$ Evaluation | $V_1$ (V) | $V_2$ (V) | $\Delta V$ (mV) | $\Delta V$ Evaluation |
|---|---|---|---|---|---|---|
| J1 | 20880 | Eligible | 3.155 | 3.152 | −3 | Eligible |
| J2 | 20750 | Eligible | 3.165 | 3.161 | −4 | Eligible |
| J3 | 20520 | Eligible | 3.158 | 3.152 | −6 | Eligible |
| J4 | 20810 | Eligible | 3.159 | 3.155 | −4 | Eligible |
| J5 | 20750 | Eligible | 3.161 | 3.156 | −5 | Eligible |
| J6 | 21030 | Eligible | 3.153 | 3.149 | −4 | Eligible |
| J7 | 20960 | Eligible | 3.152 | 3.131 | −21 | Ineligible |
| J8 | 21060 | Eligible | 3.157 | 3.153 | −4 | Eligible |
| J9 | 20940 | Eligible | 3.159 | 3.154 | −5 | Eligible |
| J10 | 20910 | Eligible | 3.164 | 3.160 | −4 | Eligible |
| J11 | 21060 | Eligible | 3.163 | 3.158 | −5 | Eligible |
| J12 | 20690 | Eligible | 3.161 | 3.158 | −3 | Eligible |
| J13 | 20840 | Eligible | 3.153 | 3.149 | −4 | Eligible |
| J14 | 21010 | Eligible | 3.155 | 3.151 | −4 | Eligible |
| J15 | 20550 | Eligible | 3.158 | 3.153 | −5 | Eligible |
| J16 | 20560 | Eligible | 3.160 | 3.155 | −5 | Eligible |
| J17 | 20650 | Eligible | 3.162 | 3.155 | −7 | Eligible |
| J18 | 20880 | Eligible | 3.157 | 3.151 | −6 | Eligible |
| J19 | 20730 | Eligible | 3.158 | 3.153 | −5 | Eligible |
| J20 | 20640 | Eligible | 3.156 | 3.142 | −14 | Ineligible |

Step (5): grouping the batteries whose capacity differences are within 3% to assemble into the battery packs. Table.4 shows there are two groups of batteries allowed to be assembled into the 1P-8S battery packs, including a group containing J1, J4, J6, J8, J10, J12, J13 and J14 whose voltage differences are minimum and the SD levels have good consistency, and another group containing J2, J5, J9, J11, J15, J16, J18 and J19 whose voltage differences are close and the SD levels are closed;

Step (6): welding and assembling each of the battery packs after the eligible batteries have been grouped in Step (5), adding 8S protection boards to each of the battery packs to form a battery assembly. The 8S protection board has no balancing function, wherein the over-charge protection voltage thereof is 3.9V/section, and the over-discharge protection voltage thereof is 2V/section.

Verification

A first battery pack assembled according to the above-mentioned steps is charged with a constant current of 10 A to a charge cut-off voltage of 29.2V, and is changed to be charged with a constant voltage of 29.2V to a charge cut-off current of 1000 mA. Then, the first battery pack is discharged with a constant current of 10 A to a discharge cut-off voltage of 16V, totally releasing a capacity of 20680 mAh. The instantaneous discharge cut-off voltages of the batteries in the first battery pack have high consistency, as shown in Table.5.

TABLE 5

| Battery No. | Discharge Cut-Off Component Voltage (V) |
|---|---|
| J1 | 2.088 |
| J4 | 2.086 |
| J6 | 2.065 |
| J8 | 2.079 |
| J10 | 2.035 |
| J12 | 2.011 |
| J13 | 2.045 |
| J14 | 2.068 |

Then, the first battery pack is charged and discharged with a current of 0.5 $C_5$ for at least one cycle. The discharged capacities and the total discharge cut-off voltages are recorded, and the total discharge cut-off voltages are used to calculate the average discharge cut-off component voltages, as shown in Table.6.

TABLE 6

| Number of Cycles | Discharge Capacity (mAh) | Total discharge cut-off voltage (V) | Average Discharge Cut-Off Component Voltage (V) |
|---|---|---|---|
| 1 | 20680 | 16.48 | 2.060 |
| 2 | 20674 | 16.48 | 2.060 |
| 3 | 20688 | 16.49 | 2.061 |
| 4 | 20662 | 16.47 | 2.059 |
| 5 | 20673 | 16.50 | 2.063 |
| 6 | 20656 | 16.52 | 2.065 |
| 7 | 20668 | 16.48 | 2.060 |
| 8 | 20671 | 16.49 | 2.061 |
| 9 | 20654 | 16.52 | 2.065 |
| 10 | 20648 | 16.51 | 2.064 |
| 11 | 20652 | 16.53 | 2.066 |
| 12 | 20642 | 16.50 | 2.063 |
| 13 | 20665 | 16.54 | 2.068 |
| 14 | 20638 | 16.52 | 2.065 |
| 15 | 20658 | 16.53 | 2.066 |
| 16 | 20652 | 16.55 | 2.069 |
| 17 | 20645 | 16.52 | 2.065 |
| 18 | 20633 | 16.54 | 2.068 |
| 19 | 20649 | 16.56 | 2.070 |
| 20 | 20652 | 16.52 | 2.065 |

With the number of cycles increasing, the released capacities of the first battery pack remain stable, and the total discharge cut-off voltages as well as the average discharge cut-off component voltages have a good consistency.

Safety Test

Nails are used to pierce the batteries J3 and J17, which are not used to assemble the battery packs, to cause the internal short circuit of the batteries at a room temperature of 28° C. The short-circuit points are detected to respectively have maximum temperatures of 43° C. and 45° C.—separately 15° C. and 17° C. higher than the room temperature, and the batteries neither burn nor explode.

Embodiment III

The Type 11065145Fe lithium iron phosphate battery is a product of our company and has a stander voltage of 3.2V and a rated capacity of 9 Ah. The Type 11065145Fe lithium iron phosphate batteries are to be assembled into a plurality of 1P-8S battery packs. According to the method of the present invention, the batteries are processed with the following steps:

Step (1): charging and discharging the batteries for two cycles with a charge/discharge current of 0.5 $C_5$, recording the discharge capacity $C_0$ of the first cycle, and determining the batteries with $C_0 \geq 9$ Ah to be eligible batteries; discharging the batteries with a constant current of 0.5 $C_5$ for 115.2 minutes in the second cycle to release 96% electricity (SOC 4%) and make the batteries in a low-charged state;

Step (2): storing the batteries of SOC 4% processed in Step (1) at a room temperature for 12 hours, recording the battery voltage $V_1$ of each of the batteries after being stored, then storing the batteries at room temperature for 168 hours, recording the battery voltage $V_2$ of each of the batteries after being stored, calculating a voltage difference $\Delta V = V_2 - V_1$, and determining the batteries with the voltage difference $\Delta V$ of −10 mV~5 mV to be eligible batteries; (Table.7 lists the data obtained from batteries processed the preceding steps.)

TABLE 7

| Battery No. | $C_0$ (mAh) | $C_0$ Evaluation | $V_1$ (V) | $V_2$ (V) | $\Delta V$ (mV) | $\Delta V$ Evaluation |
|---|---|---|---|---|---|---|
| K1 | 9360 | Eligible | 3.157 | 3.151 | −6 | Eligible |
| K2 | 9550 | Eligible | 3.168 | 3.162 | −6 | Eligible |
| K3 | 9510 | Eligible | 3.151 | 3.153 | 2 | Eligible |
| K4 | 9630 | Eligible | 3.158 | 3.159 | 1 | Eligible |
| K5 | 9350 | Eligible | 3.168 | 3.155 | −13 | Ineligible |
| K6 | 9530 | Eligible | 3.156 | 3.152 | −4 | Eligible |
| K7 | 9460 | Eligible | 3.162 | 3.163 | 1 | Eligible |
| K8 | 9540 | Eligible | 3.167 | 3.162 | −5 | Eligible |
| K9 | 9520 | Eligible | 3.157 | 3.153 | −4 | Eligible |
| K10 | 9610 | Eligible | 3.166 | 3.160 | −6 | Eligible |
| K11 | 9480 | Eligible | 3.153 | 3.156 | 3 | Eligible |
| K12 | 9390 | Eligible | 3.165 | 3.159 | −6 | Eligible |
| K13 | 9740 | Eligible | 3.153 | 3.151 | −2 | Eligible |
| K14 | 9620 | Eligible | 3.168 | 3.161 | −7 | Eligible |
| K15 | 9590 | Eligible | 3.159 | 3.143 | −16 | Ineligible |
| K16 | 9470 | Eligible | 3.165 | 3.159 | −6 | Eligible |
| K17 | 9640 | Eligible | 3.161 | 3.157 | −4 | Eligible |
| K18 | 9380 | Eligible | 3.167 | 3.162 | −5 | Eligible |
| K19 | 9660 | Eligible | 3.168 | 3.161 | −7 | Eligible |
| K20 | 9540 | Eligible | 3.159 | 3.156 | −3 | Eligible |

Step (3): grouping the batteries whose capacity differences are within 4% to assemble into the battery packs. Table.7 shows there are two groups of batteries allowed to be assembled into the 1P-8S battery packs, including a group containing K3, K4, K7, K9, K11, K13, K17 and K20 whose voltage differences are minimum and the SD levels have good consistency, and another group containing K1, K2, K6, K8, K10, K12, K16 and K18 whose voltage differences are close and the SD levels are closed;

Step (4): welding and assembling each of the battery packs after the eligible batteries have been grouped in Step (3), adding 8S protection boards to each of the battery packs to form a battery assembly. The 8S protection board has no balancing function, wherein the over-charge protection voltage thereof is 3.9V/section, and the over-discharge protection voltage thereof is 2V/section.

Verification

A first battery pack assembled according to the above-mentioned steps is charged with a constant current of 4.5 A to a charge cut-off voltage of 29.2V, and is changed to be charged with a constant voltage of 29.2V to a charge cut-off current of 450 mA. Then, the first battery pack is discharged with a constant current of 4.5 A to a discharge cut-off voltage of 16V, totally releasing a capacity of 9360 mAh. The instantaneous discharge cut-off voltages of the batteries in the first battery pack have high consistency, as shown in Table.8.

TABLE 8

| Battery No. | Discharge Cut-Off Component Voltage (V) |
|---|---|
| K3 | 2.098 |
| K4 | 2.089 |
| K7 | 2.005 |
| K9 | 2.069 |
| K11 | 2.039 |
| K13 | 2.071 |
| K17 | 2.055 |
| K20 | 2.048 |

Then, the first battery pack is charged and discharged with a current of 0.5 $C_5$ for at least one cycle. The discharged capacities and the total discharge cut-off voltages are recorded, and the total discharge cut-off voltages are used to calculate the average discharge cut-off component voltages, as shown in Table.9.

TABLE 9

| Number of Cycles | Discharge Capacity (mAh) | Total discharge cut-off voltage (V) | Average Discharge Cut-Off Component Voltage (V) |
|---|---|---|---|
| 1 | 9360 | 16.47 | 2.059 |
| 2 | 9382 | 16.56 | 2.070 |
| 3 | 9375 | 16.57 | 2.071 |
| 4 | 9370 | 16.67 | 2.084 |
| 5 | 9368 | 16.66 | 2.083 |
| 6 | 9359 | 16.68 | 2.085 |
| 7 | 9350 | 16.51 | 2.064 |
| 8 | 9366 | 16.59 | 2.074 |
| 9 | 9352 | 16.57 | 2.071 |
| 10 | 9348 | 16.59 | 2.074 |
| 11 | 9356 | 16.63 | 2.079 |
| 12 | 9358 | 16.59 | 2.074 |
| 13 | 9344 | 16.65 | 2.081 |
| 14 | 9349 | 16.64 | 2.080 |
| 15 | 9357 | 16.71 | 2.089 |
| 16 | 9351 | 16.62 | 2.078 |
| 17 | 9346 | 16.78 | 2.098 |
| 18 | 9339 | 16.81 | 2.101 |
| 19 | 9350 | 16.75 | 2.094 |
| 20 | 9345 | 16.72 | 2.090 |

With the number of cycles increasing, the released capacities of the first battery pack remain stable, and the total discharge cut-off voltages as well as the average discharge cut-off component voltages have a good consistency.

Safety Test

Nails are used to pierce the batteries K14 and K19, which are not used to assemble the battery packs, to cause the internal short circuit of the batteries at a room temperature of 27° C. The short-circuit points are detected to respectively have maximum temperatures of 40° C. and 42° C.—separately 13° C. and 15° C. higher than the room temperature, and the batteries neither burn nor explode.

What is claimed is:

1. A method for grouping lithium secondary battery packs comprising the steps of:

Step (1): charging and discharging batteries for 1-3 cycles, recording a last discharge capacity $C_0$ of each of the batteries, setting a capacity lower limit, and determining the batteries with the $C_0$ thereof not less than the capacity lower limit to be eligible batteries, wherein the capacity lower limit is a minimum eligible capacity defined by industry technology and normally equal to or higher than a rated capacity $C_5$;

Step (2): discharging continuously the batteries with 0.01-0.5$C_5$ to a discharge cut-off voltage $V_d$ of 2.0-3.0V so as to discharge the batteries to a power empty state;

Step (3): charging the batteries, which have been discharged to the power empty state in Step (2), with 0.01-0.5$C_5$ to a capacity $C_1$, which is 0.1-10% of the rated capacity $C_5$;

Step (4): storing the batteries processed in Step (3) for time $t_1$ in an environment with a temperature ranging between 20-50° C., and measuring and recording a battery voltage $V_1$ of each of the batteries after being stored; storing continuously the batteries for time $t_2$ in the environment with the temperature ranging between 20-50° C., and measuring a battery voltage $V_2$ of each of the batteries after being stored, calculating a voltage difference $\Delta V=V_2-V_1$, and setting a range of $\Delta V$ to be from −20mV to 10mV, wherein $t_1$ ranges from 1 to 48 hours and $t_2$ ranges from 24-240 hours;

Step (5): grouping the eligible batteries in Step (4) into a plurality of battery packs including a specified number of series batteries according to a certain capacity grouping standard, and welding each of the battery packs to form a battery assembly, wherein a capacity difference of the batteries in one of the battery packs is not greater than 5% of the rated capacity $C_5$.

2. The method of claim 1, wherein the batteries are charged with a constant current of 0.1-5 $C_5$ to a charge cut-off voltage of 3.6-4.2V, and the batteries are changed to be charged with a constant voltage to a charge cut-off current of 0.01-0.5$C_5$, and then the batteries are discharged with a constant current of 0.2-10 $C_5$ to the discharge cut-off voltage $V_d$ of 2-3V, wherein the capacity $C_1$ is 2-5% of the rated capacity $C_5$, and wherein the $\Delta V$ is measured at a room temperature and has an eligible range from −10mV to 5mV, and wherein the capacity difference of the batteries in one of the battery packs is not greater than 2% of the rated capacity $C_5$.

3. A method for grouping lithium secondary battery packs, comprising the steps of:

Step (1): charging and discharging batteries for 1-3 cycles, recording a last discharge capacity $C_0$ of each of the batteries, setting a capacity lower limit, and determining the batteries with the $C_0$ thereof not less than the capacity lower limit to be eligible batteries, wherein the capacity lower limit is a minimum eligible capacity defined by industry technology and normally equal to or higher than a rated capacity $C_5$;

Step (2): discharging continuously the batteries with 0.01-0.5 $C_5$ to a discharge cut-off voltage $V_d$ of 2.0-3.0V so as to discharge the batteries to a power empty state;

Step (3): storing the batteries processed in Step (2) for time $t_1$ in an environment with a temperature ranging between 20-50° C., and measuring and recording a battery voltage $V_1$ of each of the batteries after being stored; storing continuously the batteries for time $t_2$ in the environment with the temperature ranging between 20-50° C., and measuring a battery voltage $V_2$ of each of the batteries after being stored, calculating a voltage difference $\Delta V=V_2-V_1$, and setting a range of $\Delta V$ to be from −20mV to 10mV, wherein $t_1$ ranges from 1 to 48 hours and $t_2$ ranges from 24-240 hours;

Step (4): grouping the eligible batteries in Step (3) into a plurality of battery packs each including a specified number of series batteries according to a certain capacity grouping standard, and welding each of the battery packs to form a battery assembly, wherein a capacity difference of the batteries in one of the battery packs is not greater than 5% of the rated capacity $C_5$.

4. The method of claim 3, wherein the batteries are charged with a constant current of 0.1-5 $C_5$ to a charge cut-off voltage of 3.6-4.2V, and the batteries are changed to be charged with a constant voltage to a charge cut-off current of 0.01-0.5 $C_5$, and then the batteries are discharged with a constant current of 0.2-10 $C_5$ to the discharge cut-off voltage $V_d$ of 2-3V, wherein no batteries is charged after Step (2), and wherein the $\Delta V$ is measured at a room temperature and has an eligible range from -10mV to 5mV, and wherein the capacity difference of the batteries in one of the battery packs is not greater than 2% of the rated capacity $C_5$.

5. A method for grouping lithium secondary battery packs, comprising the steps of:

Step (1): charging and discharging batteries for 2-3 cycles, recording a second last discharge capacity $C_0$ of each of the batteries, setting a capacity lower limit, and determining the batteries with the $C_0$ thereof not less than the capacity lower limit to be eligible batteries, wherein the capacity lower limit is a minimum eligible capacity defined by industry technology and normally equal to or higher than a rated capacity $C_5$, and wherein a last discharge capacity is controlled to be 90-99.9% of the rated capacity $C_5$ so that a remaining capacity of the batteries is 0.1-10% of the rated capacity $C_5$ to make the batteries in a low-charged state;

Step (2): storing the batteries processed in Step (1) for time $t_1$ in an environment with a temperature ranging between 20-50° C., and measuring and recording a battery voltage $V_1$ of each of the batteries after being stored; storing continuously the batteries for time $t_2$ in the environment with the temperature ranging between 20-50° C., and measuring a battery voltage $V_2$ of each of the batteries after being stored, calculating a voltage difference $\Delta V=V_2-V_1$, and setting a range of $\Delta V$ to be from −20mV to 10mV, wherein $t_1$ ranges from 1 to 48 hours and $t_2$ ranges from 24-240 hours;

Step (3): grouping the eligible batteries in Step (2) into a plurality of battery packs each including a specified number of series batteries according to a certain capacity grouping standard, and welding each of the battery packs to form a battery assembly, wherein a capacity difference of the batteries in one of the battery packs is not greater than 5% of the rated capacity $C_5$.

6. The method of claim 5, wherein the last discharge releases 95-98% of the rated capacity $C_5$ with only 2-5% of the rated capacity $C_5$ remaining in the batteries, and wherein $\Delta V$ is measured at a room temperature and is eligible with a range from −10mV to 5mV, and wherein the capacity deviation of each battery of the battery packs is not greater than 2% of the rated capacity $C_5$.

\* \* \* \* \*